United States Patent
Kim et al.

(10) Patent No.: US 12,343,883 B2
(45) Date of Patent: Jul. 1, 2025

(54) EXTERNAL LIGHT INFLUENCE SOLUTION SYSTEM FOR MOBILE ROBOT AND METHOD THEREFOR

(71) Applicant: B-ROBOTICS CO., LTD., Seoul (KR)

(72) Inventors: Myung Sik Kim, Suwon-si (KR); Min Su Kim, Namyangju-si (KR)

(73) Assignee: B-ROBOTICS CO., LTD., Seoul (KR)

( * ) Notice: Subject to any disclaimer, the term of this patent is extended or adjusted under 35 U.S.C. 154(b) by 202 days.

(21) Appl. No.: 18/018,572

(22) PCT Filed: Jul. 29, 2021

(86) PCT No.: PCT/KR2021/009867
§ 371 (c)(1),
(2) Date: Jan. 29, 2023

(87) PCT Pub. No.: WO2022/025658
PCT Pub. Date: Feb. 3, 2022

(65) Prior Publication Data
US 2023/0294290 A1 Sep. 21, 2023

(30) Foreign Application Priority Data

Jul. 29, 2020 (KR) .................. 10-2020-0094813
Jul. 29, 2021 (KR) .................. 10-2021-0099620

(51) Int. Cl.
*B25J 9/16* (2006.01)
*B25J 5/00* (2006.01)
*B25J 19/02* (2006.01)

(52) U.S. Cl.
CPC ............. *B25J 9/1694* (2013.01); *B25J 5/007* (2013.01); *B25J 19/023* (2013.01)

(58) Field of Classification Search
CPC ....... B25J 5/007; B25J 19/023; G01S 7/4816; G01S 17/88; G01S 17/931; G01S 17/89
See application file for complete search history.

(56) References Cited

U.S. PATENT DOCUMENTS

2017/0210486 A1* 7/2017 O'Brien ................ H04N 23/71
2018/0091717 A1 3/2018 Ion
(Continued)

FOREIGN PATENT DOCUMENTS

JP 2002-073170 3/2002
JP 2010-107212 5/2010
(Continued)

OTHER PUBLICATIONS

International Search Report dated Feb. 3, 2022, in International Application No. PCT/KR2021/009867.
(Continued)

*Primary Examiner* — Khoi H Tran
*Assistant Examiner* — Nhi Q Bui
(74) *Attorney, Agent, or Firm* — Osha Bergman Watanabe & Burton LLP (57) ABSTRACT

An external light influence solution system includes a mobile robot and a control system for controlling an operation of the mobile robot including a light-emitting part for emitting light for sensing; a light-receiving part which includes at least one camera and receives the light emitted from the light-emitting part; a filter part which is positioned on the front surface of the light-receiving part to be spaced a predetermined interval apart from the light-receiving part so as to block external light having a specific wavelength, which is oriented toward the light-receiving part; and a control part for measuring a distance from an obstacle on the basis of the light received by the light-receiving part, and when the filter part is positioned on the front surface of the light-receiving part, the control part adjusts the brightness of a lens of the camera in order to receive the light.

6 Claims, 8 Drawing Sheets

(56) References Cited

U.S. PATENT DOCUMENTS

| | | | | |
|---|---|---|---|---|
| 2019/0212750 A1* | 7/2019 | Hou | ............................ | G06T 7/74 |
| 2020/0122344 A1* | 4/2020 | Lee | .......................... | B25J 9/1697 |
| 2021/0264572 A1* | 8/2021 | Hrabe | ........................ | G06T 5/92 |

FOREIGN PATENT DOCUMENTS

| | | |
|---|---|---|
| KR | 10-2005-0083341 | 8/2005 |
| KR | 10-1083700 | 11/2011 |
| KR | 10-2016-0088466 | 7/2016 |
| KR | 10-2018-0136294 | 12/2018 |
| KR | 10-1980697 | 5/2019 |
| KR | 101980697 B1 * | 5/2019 |

OTHER PUBLICATIONS

Extended European Search Report issued in European Patent Application No. 21850771.3, mailed May 14, 2024 (8 pages).

* cited by examiner

EXTERNAL LIGHT INFLUENCE SOLUTION SYSTEM FOR MOBILE ROBOT AND METHOD THEREFOR

This application is a National Stage Entry of PCT/KR2021/009867 filed on Jul. 29, 2021 and claims priority from and the benefit of Korean Patent Application No. 10-2020-0094813 filed on Jul. 29, 2020 and Korean Patent Application No. 10-2021-0099620 filed on Jul. 29, 2021, each of which is hereby incorporated by reference for all purposes as if fully set forth herein.

BACKGROUND

Field

Embodiments of the invention relate generally to an external light influence solution system for a mobile robot and a method therefor, and more particularly, to a technical idea for preventing an abnormal operation such as a sudden stop or a sudden turn of a mobile robot, by preventing obstacle detection errors due to external light (e.g., sunlight or external lighting, etc.) flowing into the light receiver of the mobile robot, when the mobile robot is driving.

Discussion of the Background

Due to the increasing preference for non-face-to-face services along with staffing, management issues, and cost (labor cost) issues, the introduction of mobile robots such as serving robots is becoming active.

Mobile robots such as serving robots use various sensors and devices for location recognition and obstacle collision prevention when moving (driving). For example, sensors or devices based on light detection such as light detection and ranging (LIDAR) and cameras are mainly used. These sensors mainly use light in a non-visible band (e.g., near-infrared band) so that it is not visible to the human eyes.

However, the same or similar band of light may be output from halogen lighting widely used in indoor stores such as restaurants and the like, which may affect the sensor of the mobile robot, and natural light flowing in through windows or the like may also be detected by the sensor of the mobile robot.

Such external light (external lighting) such as halogen lighting or natural light may be a factor that can cause misdetection by the sensor of the mobile robot. For example, even if there is no actual obstacle on the path while the mobile robot is driving, when external light is incident on the sensor, the sensor misdetects it as a short-range obstacle, and the mobile robot may perform an operation of stopping or turning in a hurry.

As described above, when a mobile robot is used as a serving robot in a store, the serving robot often loads food and drives, but when the serving robot causes a sudden change in speed (sudden stop) or turns due to misdetection of the sensor due to external light, the loaded food may overflow or the container containing the food may overturn, causing dissatisfaction not only to the customer who ordered the food but also to the store user using the serving robot.

FIG. 1 is a diagram for explaining a principle and an error cause of a sensor used in a conventional general mobile robot.

Figure 1A:
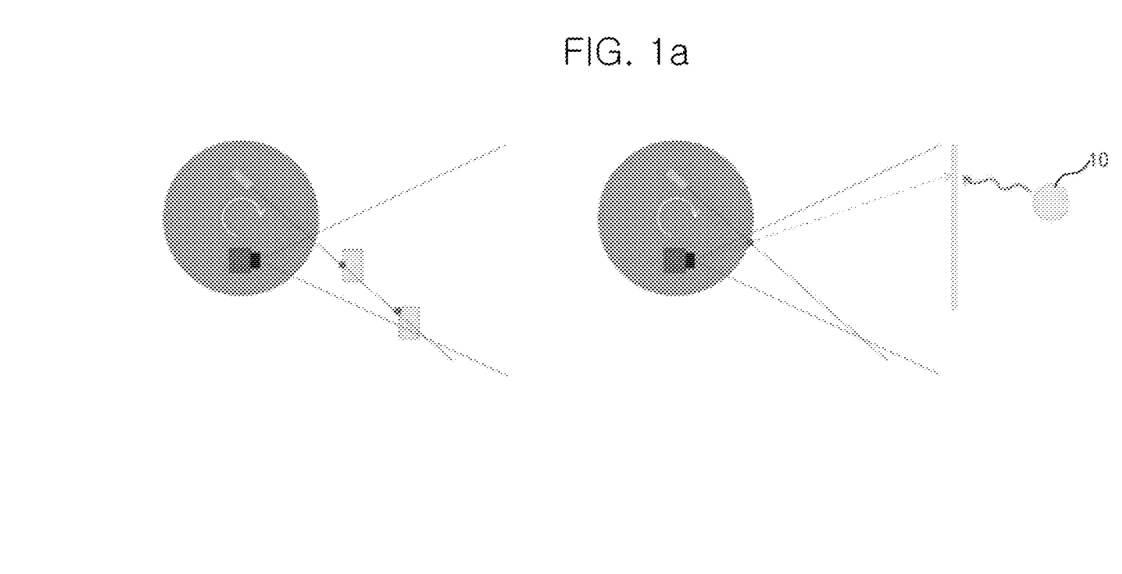
FIG. 1 is a diagram for illustrating a principle and an error cause of a sensor used in a conventional general mobile robot.

First of all, referring to FIG. 1A, a LiDAR (Light Detection And Ranging) sensor is applied to a mobile robot.

In the case of lidar sensors, after irradiating the laser light, the distance is measured according to the position of the camera's light source according to the distance.

In this case, when the outer light 10 is irradiated, the sensor may misdetect it as a short-range obstacle while the light is irradiated to the near-field pixel, and the malfunction of the mobile robot may occur as described above.

Figure 1B:
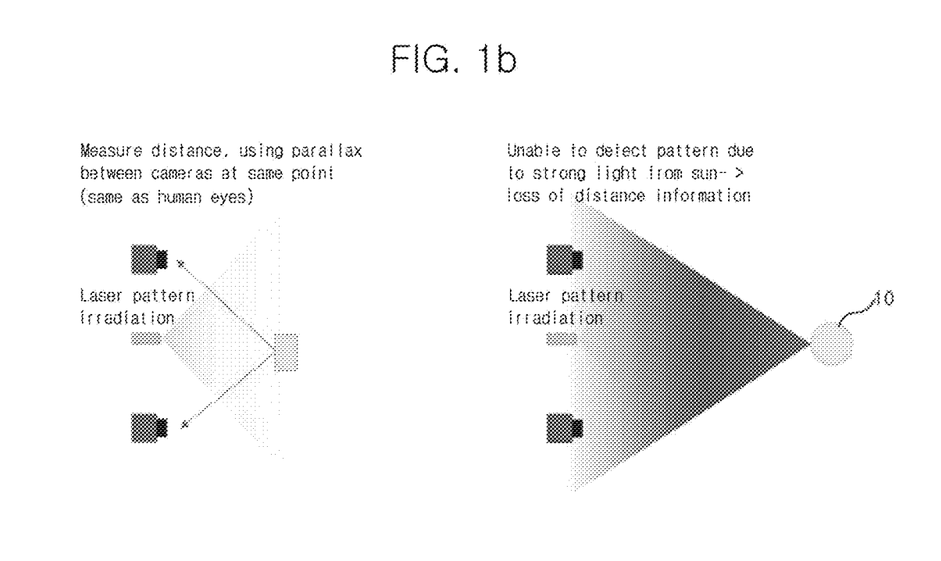

FIG. 1B shows a case in which an RGBD sensor is applied to a mobile robot, and in the case of an RGBD sensor, a method of measuring a distance using two camera parallax for the same pattern point is used after irradiating a laser pattern.

At this time, weak laser light is used due to eye safety issues, and in this case, distance measurement is practically impossible, so the sensor generally receives the IR band of visible light and laser at the same time, so it can be affected by visible light in addition to IR light.

In the drawings, a case in which the external light 10 is sunlight (natural light) is shown, but in the present specification, the external light 10 may include not only sunlight but also light in a wavelength band within the light receiving range of the sensor.

Conventionally, the focus is on removing the influence of the external light 10 by fundamentally blocking the light entering the sensor of the mobile robot. For example, a method of removing indoor lighting or installing blinds or blackout sheet paper on a window to block a light source, which is the source of light incident on the sensor, is mainly used.

However, in indoor spaces, lighting and windows are factors that have a great impact on the interior, and it is not easy to change the lighting or windows, especially in places such as stores. As a result, some stores may be reluctant to introduce mobile robots (serving robots).

Therefore, a technical idea is required to minimize the effect of the external light on the sensor receiver of the mobile robot so that the operation of the mobile robot 100 is more stable, and not to be interfered by the lighting or daylight of the indoor space.

A relevant Patent Document includes Korean Patent (Patent No. 10-1083700, "Robot System for Restaurant Serving")

The above information disclosed in this Background section is only for understanding of the background of the inventive concepts, and, therefore, it may contain information that does not constitute prior art.

SUMMARY

An object to be achieved by the present disclosure is to provide a technical idea capable of preventing an abnormal operation such as a sudden stop or a sudden turn of a mobile robot, by installing a filter that can selectively block only a specific band of light in the sensor of the mobile robot and/or the external light source to prevent obstacle detection errors caused by external light (e.g., sunlight or external lighting) reflected on the sensor of the mobile robot while the mobile robot is driving.

Additional features of the inventive concepts will be set forth in the description which follows, and in part will be apparent from the description, or may be learned by practice of the inventive concepts.

An external light influence solution system of a mobile robot according to an aspect of the present disclosure for solving the above technical problem may include a mobile robot, and a control system configured to control an operation of the mobile robot, wherein the control system may include a light emitter configured to irradiate light for sensing, a light receiver including at least one camera and configured to receive the light irradiated from the light emitter, a filter unit disposed on a front side of the light receiver to be spaced apart from the light receiver by a predetermined distance to block external light of a specific wavelength toward the light receiver, and a controller configured to measure a distance to an obstacle based on the light received by the light receiver, wherein the controller is configured to, when the filter unit is disposed on the front side of the light receiver, adjust a lens brightness of the camera for receiving the light.

In addition, the light emitter may be configured to irradiate a laser with a specific pattern.

In addition, the controller may be configured to adjust the lens brightness so that an amount of light received by the light receiver has a maximum value.

In addition, when an external light corresponding to direct sunlight is received, the controller may be configured to move the mobile robot to a place where the direct sunlight is received below a predetermined level and then adjusts the lens brightness.

In addition, the filter unit may include a plurality of filters, and the controller may be configure to allow a specific filter among the plurality of filters to be selectively disposed on the front side of the light receiver according to a time zone or a wavelength range of external light received by the light receiver.

An external light influence solution system of a mobile robot according to an aspect of the present disclosure for solving the above technical problem may include a driving unit, a light emitter configured to irradiate light for sensing, a light receiver including at least one camera and configured to receive the light irradiated from the light emitter, a filter unit disposed on a front side of the light receiver to be spaced apart from the light receiver by a predetermined distance to block external light of a specific wavelength toward the light receiver, and a controller configured to control drive of the driving unit and measure a distance to an obstacle based on the light received by the light receiver, wherein the controller may be configured to, when the filter unit is disposed on the front side of the light receiver, adjust a lens brightness of the camera for receiving the light.

A method for external light influence solution according to an aspect of the present disclosure for solving the above technical problem may include detecting external light received, by an external light influence solution system of a mobile robot, when the external light is detected, applying a filter capable of blocking external light of a specific wavelength band to the mobile robot, by the external light influence solution system of the mobile robot, and adjusting a lens brightness of a camera for receiving the light by using light irradiated from a light emitter configured to irradiate light for sensing, by the external light influence solution system of the mobile robot.

A computer program installed on a data processing device and stored on a recording medium to perform the method of described above may be provided.

According to an embodiment of the present disclosure, there is an effect of preventing an abnormal operation such as a sudden stop or a sudden turn of a mobile robot, by installing a filter that can selectively block only a specific band of light in the sensor of the mobile robot and/or the external light source to prevent obstacle detection errors caused by external light (e.g., sunlight or external lighting) reflected on the sensor of the mobile robot while the mobile robot is driving.

In addition, in order to block light that may affect the sensor of the mobile robot, external light is not completely blocked, and only light in a specific band (mainly invisible band) detected by the sensor can be selectively blocked, so that there is no need to degrade the interior or lighting of stores using mobile robots, which has the effect of inducing active introduction of users.

It is to be understood that both the foregoing general description and the following detailed description are exemplary and explanatory and are intended to provide further explanation of the invention as claimed.

BRIEF DESCRIPTION OF THE DRAWING

The accompanying drawings, which are included to provide a further understanding of the invention and are incorporated in and constitute a part of this specification, illustrate exemplary embodiments of the invention, and together with the description serve to explain the inventive concepts.

DETAILED DESCRIPTION

In the following description, for the purposes of explanation, numerous specific details are set forth in order to provide a thorough understanding of various exemplary embodiments or implementations of the invention. As used herein "embodiments" and "implementations" are interchangeable words that are non-limiting examples of devices or methods employing one or more of the inventive concepts disclosed herein. It is apparent, however, that various exemplary embodiments may be practiced without these specific details or with one or more equivalent arrangements. In other instances, well-known structures and devices are shown in block diagram form in order to avoid unnecessarily obscuring various exemplary embodiments. Further, various exemplary embodiments may be different, but do not have to be exclusive. For example, specific shapes, configurations, and characteristics of an exemplary embodiment may be used or implemented in another exemplary embodiment without departing from the inventive concepts.

Unless otherwise specified, the illustrated exemplary embodiments are to be understood as providing exemplary features of varying detail of some ways in which the inventive concepts may be implemented in practice. Therefore, unless otherwise specified, the features, components, modules, layers, films, panels, regions, and/or aspects, etc. (hereinafter individually or collectively referred to as "elements"), of the various embodiments may be otherwise combined, separated, interchanged, and/or rearranged without departing from the inventive concepts.

The use of cross-hatching and/or shading in the accompanying drawings is generally provided to clarify boundaries between adjacent elements. As such, neither the presence nor the absence of cross-hatching or shading conveys or indicates any preference or requirement for particular materials, material properties, dimensions, proportions, commonalities between illustrated elements, and/or any other characteristic, attribute, property, etc., of the elements, unless specified. Further, in the accompanying drawings, the size and relative sizes of elements may be exaggerated for clarity and/or descriptive purposes. When an exemplary embodiment may be implemented differently, a specific process order may be performed differently from the described order. For example, two consecutively described processes may be performed substantially at the same time or performed in an order opposite to the described order. Also, like reference numerals denote like elements.

When an element, such as a layer, is referred to as being "on," "connected to," or "coupled to" another element or layer, it may be directly on, connected to, or coupled to the other element or layer or intervening elements or layers may be present. When, however, an element or layer is referred to as being "directly on," "directly connected to," or "directly coupled to" another element or layer, there are no intervening elements or layers present. To this end, the term "connected" may refer to physical, electrical, and/or fluid connection, with or without intervening elements. Further, the D1-axis, the D2-axis, and the D3-axis are not limited to three axes of a rectangular coordinate system, such as the x, y, and z-axes, and may be interpreted in a broader sense. For example, the D1-axis, the D2-axis, and the D3-axis may be perpendicular to one another, or may represent different directions that are not perpendicular to one another. For the purposes of this disclosure, "at least one of X, Y, and Z" and "at least one selected from the group consisting of X, Y, and Z" may be construed as X only, Y only, Z only, or any combination of two or more of X, Y, and Z, such as, for instance, XYZ, XYY, YZ, and ZZ. As used herein, the term "and/or" includes any and all combinations of one or more of the associated listed items.

Although the terms "first," "second," etc. may be used herein to describe various types of elements, these elements should not be limited by these terms. These terms are used to distinguish one element from another element. Thus, a first element discussed below could be termed a second element without departing from the teachings of the disclosure.

Spatially relative terms, such as "beneath," "below," "under," "lower," "above," "upper," "over," "higher," "side" (e.g., as in "sidewall"), and the like, may be used herein for descriptive purposes, and, thereby, to describe one elements relationship to another element(s) as illustrated in the drawings. Spatially relative terms are intended to encompass different orientations of an apparatus in use, operation, and/or manufacture in addition to the orientation depicted in the drawings. For example, if the apparatus in the drawings is turned over, elements described as "below" or "beneath" other elements or features would then be oriented "above" the other elements or features. Thus, the exemplary term "below" can encompass both an orientation of above and below. Furthermore, the apparatus may be otherwise oriented (e.g., rotated 90 degrees or at other orientations), and, as such, the spatially relative descriptors used herein interpreted accordingly.

The terminology used herein is for the purpose of describing particular embodiments and is not intended to be limiting. As used herein, the singular forms, "a," "an," and "the" are intended to include the plural forms as well, unless the context clearly indicates otherwise. Moreover, the terms "comprises," "comprising," "includes," and/or "including," when used in this specification, specify the presence of stated features, integers, steps, operations, elements, components, and/or groups thereof, but do not preclude the presence or addition of one or more other features, integers, steps, operations, elements, components, and/or groups thereof. It is also noted that, as used herein, the terms "substantially," "about," and other similar terms, are used as terms of approximation and not as terms of degree, and, as such, are utilized to account for inherent deviations in measured, calculated, and/or provided values that would be recognized by one of ordinary skill in the art.

Various exemplary embodiments are described herein with reference to sectional and/or exploded illustrations that are schematic illustrations of idealized exemplary embodiments and/or intermediate structures. As such, variations from the shapes of the illustrations as a result, for example, of manufacturing techniques and/or tolerances, are to be expected. Thus, exemplary embodiments disclosed herein should not necessarily be construed as limited to the particular illustrated shapes of regions, but are to include deviations in shapes that result from, for instance, manufacturing. In this manner, regions illustrated in the drawings may be schematic in nature and the shapes of these regions may not reflect actual shapes of regions of a device and, as such, are not necessarily intended to be limiting.

As customary in the field, some exemplary embodiments are described and illustrated in the accompanying drawings in terms of functional blocks, units, and/or modules. Those skilled in the art will appreciate that these blocks, units, and/or modules are physically implemented by electronic (or optical) circuits, such as logic circuits, discrete components, microprocessors, hard-wired circuits, memory elements, wiring connections, and the like, which may be formed using semiconductor-based fabrication techniques or other manufacturing technologies. In the case of the blocks, units, and/or modules being implemented by microprocessors or other similar hardware, they may be programmed and controlled using software (e.g., microcode) to perform various functions discussed herein and may optionally be driven by firmware and/or software. It is also contemplated that each block, unit, and/or module may be implemented by dedicated hardware, or as a combination of dedicated hardware to perform some functions and a processor (e.g., one or more programmed microprocessors and associated circuitry) to perform other functions. Also, each block, unit, and/or module of some exemplary embodiments may be physically separated into two or more interacting and discrete blocks, units, and/or modules without departing from the scope of the inventive concepts. Further, the blocks, units, and/or modules of some exemplary embodiments may be physically combined into more complex blocks, units, and/or modules without departing from the scope of the inventive concepts.

Unless otherwise defined, all terms (including technical and scientific terms) used herein have the same meaning as commonly understood by one of ordinary skill in the art to which this disclosure is a part. Terms, such as those defined in commonly used dictionaries, should be interpreted as having a meaning that is consistent with their meaning in the context of the relevant art and should not be interpreted in an idealized or overly formal sense, unless expressly so defined herein.

Figure 2:
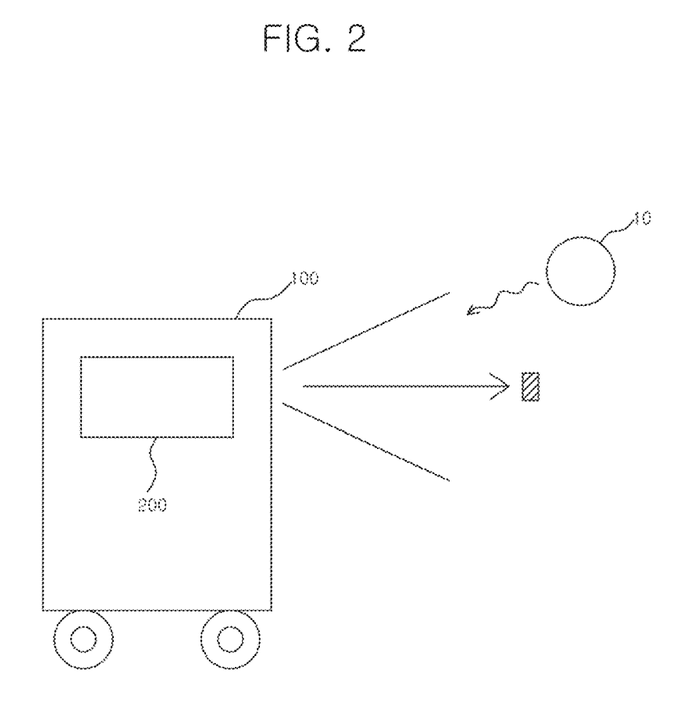
FIG. 2 schematically illustrates an external light influence solution system of a mobile robot in accordance with an embodiment of the present disclosure.

FIG. 2 schematically illustrates an external light influence solution system of a mobile robot in accordance with an embodiment of the present disclosure.

Referring to FIG. 2, the external light influence solution system of the mobile robot according to an embodiment of the present disclosure may include a mobile robot 100 and a control system 200 for controlling the operation of the mobile robot 100.

The mobile robot 100 may mean a robot capable of moving including a driving unit. For example, the mobile robot 100 may be a robot capable of driving itself along a set path including an autonomous driving function. The driving unit may mean including all devices that may be provided to move the robot, such as wheels, power engines, and wheels, and since the configuration of such a driving unit is widely known, a detailed description thereof will be omitted.

Hereinafter, the present specification describes as an example a case in which the mobile robot 100 is a serving robot that serves food to a customer in a predetermined store such as a restaurant, but the scope of the present disclosure is not necessarily limited thereto. For example, the mobile robot 100 may be implemented as a delivery robot capable of loading predetermined goods, driving an outdoor route as well as an indoor such as a store, and delivering to a customer or a predetermined destination, or may be implemented as a robot that performs a predetermined task (e.g., cleaning, newspaper delivery, etc.) moving between floors within a predetermined building.

The control system 200 may control the overall operation and/or functions of the mobile robot 100 to control the mobile robot 100 to perform the required operation. The configuration of the control system 200 for this will be described with reference to FIG. 3.

Figure 3:
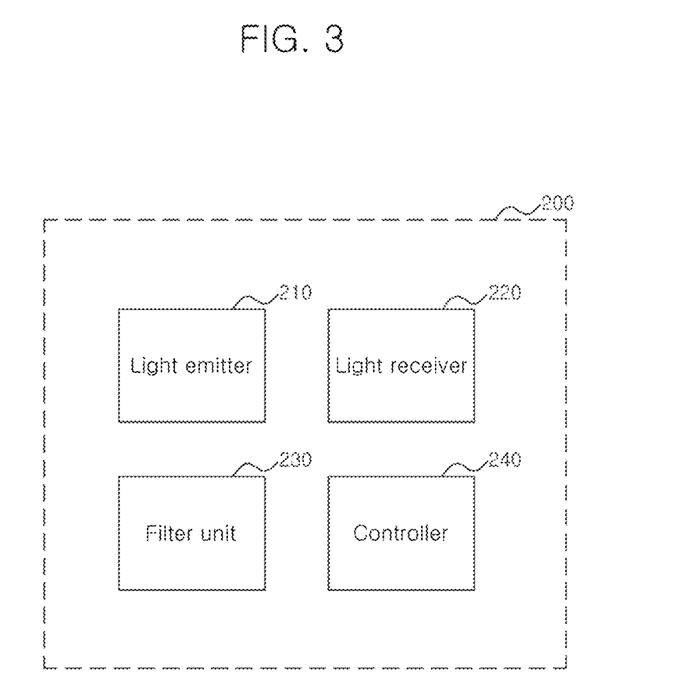
FIG. 3 illustrates a schematic configuration of a control system in accordance with an embodiment of the present disclosure.

FIG. 3 illustrates a schematic configuration of a control system in accordance with an embodiment of the present disclosure.

Referring to FIG. 3, the control system 200 may include a light emitter 210 configured to irradiate light for sensing, a light receiver 220 including at least one camera and configured to receive the light irradiated from the light emitter 210, a filter unit 30 disposed on the front side of the light receiver 220 to be spaced apart by a predetermined distance to block external light 10 of a specific wavelength toward the light receiver 220, and/or a controller 240 configured to measure a distance to an obstacle 20 based on the light received by the light receiver 220.

In one embodiment, the light irradiated by the light emitter 210 may mean a laser. According to an embodiment, the light emitter 210 may be implemented to irradiate a specific pattern of laser. Hereinafter, the light irradiated from the light emitter 210 will be described mainly when it is a laser, but the present disclosure is not necessarily limited thereto.

The light receiver 220 may detect the light received and may include at least one camera as described above. In addition, the light receiver 220 may be configured including a LiDAR sensor or an RGBD sensor as necessary, and the controller 240 may measure the distance to the obstacle 20 within the shooting range using various methods according to the shooting information shot by the light receiver 220 and/or the type of sensor. Although the present specification mainly describes the case that the sensor included in the light receiver 220 is a LiDAR sensor or an RGBD sensor for convenience of description, the present disclosure is not necessarily limited thereto. For example, in the light receiver 220, in addition to the above-described sensors using visible light, various technical ideas capable of measuring a distance to a predetermined object by the controller 240 using light irradiated by the light emitter 210, such as pattern structured light that decodes and analyzes a preset pattern or an encrypted pattern using a structured optical camera using invisible light (e.g., infrared band, etc.), or ToF (Time of Flight) cameras that generate shooting information containing distance information from the camera, etc, can be applied to the present disclosure. According to the type of sensor provided in the light receiver 220, the light emitter 210 may also vary the type of required light source. Since the technical idea of measuring a distance to a predetermined object using a predetermined light source and light irradiated or irradiated and then reflected from the light source is already well known, further detailed descriptions will be omitted herein.

For example, when the light receiver 220 is provided with a LiDAR sensor, the controller 240 may measure a distance with the obstacle 20 by using the location of the pixel formed by the laser in the shooting information. In this case, the light receiver 220 may include one camera.

Alternatively, when the light receiver 220 is provided with an RGBD sensor, the light receiver 220 may include two cameras. In this case, the controller 240 may measure the distance from the obstacle 20 in the same or similar manner to the human eyes by using the parallax between the two cameras for the same point. At this time, the light emitter 210 may irradiate a laser of a specific pattern and measure a distance with the obstacle 20 using the parallax between two cameras for the same pattern point. In addition, according to an embodiment, the controller 240 may analyze and determine the wavelength of light detected by the light receiver 220.

To this end, the controller 240 may perform a function of controlling an operation and other configurations for implementing the technical idea of the present disclosure. The controller 240 may include a processor, a storage device, and a program stored in the storage device and executed by the processor. The processor may include a CPU, GPU, MCU, APU, microprocessor, single core CPU, or multicore CPU. The storage device may mean a memory, and the memory may include a high-speed random access memory and may include a nonvolatile memory such as one or more magnetic disk storage devices, flash memory devices, or other nonvolatile solid-state memory devices. Hereinafter, in the present specification, that the mobile robot 100 and/or the controller perform a predetermined operation, an average expert in the field of the present disclosure may easily infer that the process can be performed by a series of data processing and/or control performed by executing the program.

In addition, in the present specification, the controller 240 may mean a functional and structural combination of hardware for carrying out the technical idea of the present disclosure and software for driving the hardware. For example, the controller 240 may mean a logical unit of a predetermined code and hardware resources for executing the predetermined code, and it may be easily inferred by an average expert in the technical field of the present disclosure that it does not necessarily mean physically connected codes or one kind of hardware.

Meanwhile, the filter unit 230 may be disposed on the front side of the light receiver 220, in particular, the at least one camera, and may be implemented to block the external light 10 of a specific wavelength.

As described above, in order to measure a more accurate distance of the mobile robot 100, in addition to the wavelength of the laser irradiated by the light emitter 210, it may be desirable to ensure that the external light 10, such as natural light (sunlight) or indoor lighting, is not received by the light receiver 220. Although the drawing shows a case where the external light 10 is sunlight, in the present specification, the external light 10 may mean all light of a wavelength band within the light receiving range of the light receiver 220, such as the sunlight as well as other lighting.

However, in a place such as a store where the mobile robot 100 is provided, it is practically impossible to completely block the external light 10 due to natural light entering through the window or lighting in the store. Accordingly, the filter unit 230 may be implemented to include a filter capable of blocking the visible light band in addition to the IR band of the laser to block unnecessary visible light band from being received by the light receiver 220.

According to an embodiment of the present disclosure, the controller 240 may selectively apply the filter unit 230.

That the controller 240 selectively applies the filter unit 230 may mean that the controller 240 determines whether to apply the filter unit 230 to the front side of the light receiver 220 as needed, or that a specific filter is applied as needed when a plurality of filters are provided in the filter unit 230.

Even when the external light 10 including the same visible light band is received by the light receiver 220, the type of more effective filter may be different when the external light 10 is sunlight and when it is caused by indoor lighting. Accordingly, the filter unit 230 may be provided with a plurality of different types of filters in advance according to various situations, time zones, and/or wavelength bands of the external light 10, and the controller 240 may selectively apply a necessary filter among a plurality of filters. In this case, the controller 240 may store information on a filter to be applied for each situation (e.g., according to the wavelength band of the external light 10, or according to the current time) in advance.

Figure 4:
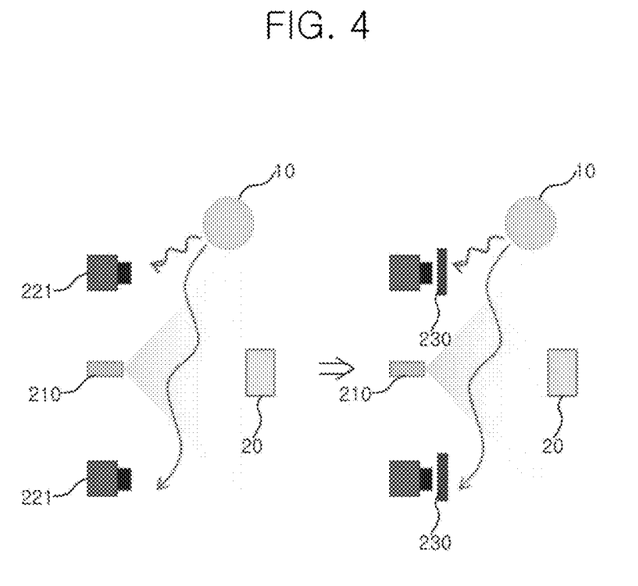
FIG. 4 is a diagram for illustrating an application of a filter unit of an external light influence solution system of a mobile robot in accordance with an embodiment of the present disclosure.

FIG. 4 is a diagram for illustrating an application of a filter unit of an external light influence solution system of a mobile robot in accordance with an embodiment of the present disclosure.

Referring to FIG. 4, an example of a case in which the light receiver 220 is provided with an RGBD sensor is shown. As described above, the filter unit 230 may be provided to be disposed on the front side of the at least one camera 221 (e.g., the direction in which the lens of the camera 221 is located), and a filter capable of blocking external light 10 of a visible light band rather than an IR band of a laser irradiated from the light emitter 210 may be applied to the filter unit 230. This may prevent the mobile robot 100 from mis-detecting the obstacle 20 or erroneously measuring the distance to the obstacle 20, and may prevent the mobile robot 100 from malfunctioning or colliding with the obstacle 20.

Meanwhile, according to the technical idea of the present disclosure, the controller 240 may adjust the lens brightness of at least one camera included in the light receiver 220 after the filter of the filter unit 230 is applied to the light receiver 220 for more accurate light receiving.

Adjusting the lens brightness of the at least one camera by the controller 240 may mean adjusting the amount of light received through the lens by adjusting the exposure of the at least one camera.

When a specific wavelength (e.g., visible light band) is blocked by the filter unit 230, the shooting information shot by the at least one camera may be relatively dark, and the light irradiated by the light emitter 210 (e.g., a laser) may not be easy to detect.

Accordingly, the controller 240 may adjust the lens brightness of the at least one camera in order to more smoothly receive light and/or detect light irradiated by the light emitter 210. In this case, the controller 240 may adjust the brightness of the lens using light (e.g., a laser) irradiated from the light emitter 210 in an environment in which the external light 10 is blocked by the filter unit 230.

In one example, the controller 240 may adjust the lens brightness so that the amount of light (e.g., laser) received by the light receiver 220 is a maximum value. However, the maximum value of the amount of light (e.g., laser) may mean a maximum value within the exposure range to the extent that the shooting information shot by the at least one camera can be recognized and analyzed by the controller 240.

According to an embodiment, the controller 240 may allow the light receiver 220 application of the filter unit 230 and/or the lens brightness adjustment to be made in a location where the mobile robot 100 is relatively less affected by external light 10.

For example, before applying the filter unit 230 and/or adjusting the lens brightness, the controller 240 may control the mobile robot 100 to move to a specific place where the external light 10 is detected below a predetermined level, and after the movement is completed, application of the filter unit 230 and/or lens brightness adjustment may be performed. For example, when the mobile robot 100 is in a location where direct sunlight flows from a window, the controller 240 may move the mobile robot 100 to a location where direct sunlight does not flow in, and then apply the filter unit 230 or perform lens brightness adjustment.

Meanwhile, in addition to the filter unit 230 applied to the front side of the light receiver 220, the influence of the external light 10 on the mobile robot 100 may be further eliminated by applying a separate filter to a window through which the external light 10 enters the indoor space.

For example, when the external light (e.g., sunlight) including an IR wavelength band equal to the laser irradiated from the light emitter 210 is flowed in, there may still be a risk of misdetection or malfunction due to external light in the IR wavelength band included in the sunlight.

Conventionally, in order to resolve the influence of external light received by the light receiver 220, the focus is on fundamentally blocking the external light entering the light receiver 220. For example, blackout sheets or blinds may be provided in a place where external light flows in such as a window, and the light source of the external light source itself may be blocked.

However, this conventional method has a problem that it is difficult to use in an indoor space where the mobile robot 100 is used, for example, in a store. Lighting and windows are elements that have a great influence on the interior of the room, and in particular, since most users do not want to completely cover windows that receive natural light with blackout sheets or change the lighting itself, it is not easy to reduce the influence of external light on the mobile robot 100, and thus there is a problem in that the introduction of the mobile robot 100 itself is reluctant.

Therefore, by providing a filter for blocking the same wavelength band as the laser on a window or the like through which the external light 10 flows in, it is possible to prevent misdetection and malfunction of the mobile robot 100 without damaging the interior of the indoor space by allowing external light in the visible light band to transmit as it is while minimizing the influence of external light 10, in particular, sunlight. An example of this is illustrated in FIG. 5.

FIG. 5 is a diagram for illustrating an external light influence solution system of a mobile robot in accordance with another embodiment of the present disclosure.

Figure 5A:
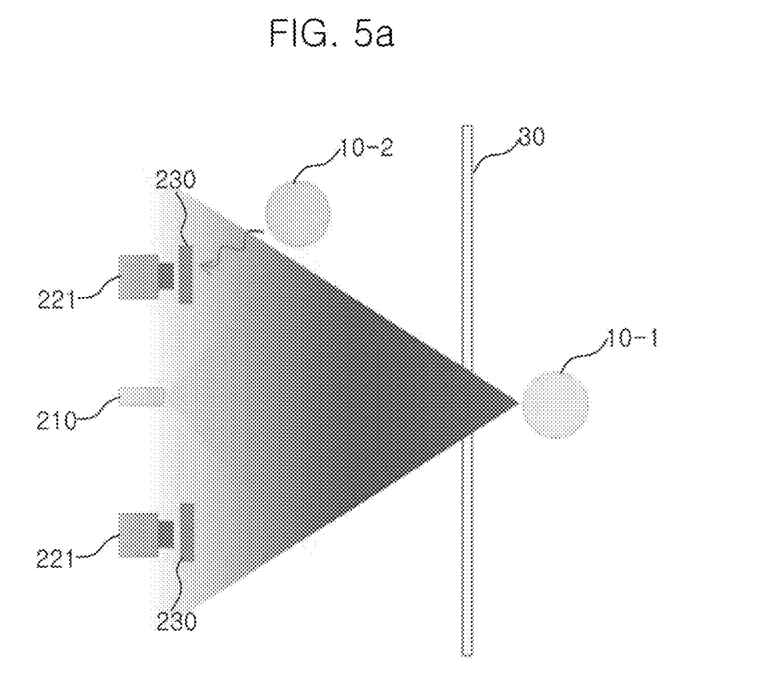
FIG. 5 is a diagram for illustrating an external light influence solution system of a mobile robot in accordance with another embodiment of the present disclosure.

Referring to FIG. 5A, there may be indoor lighting 10-2 and sunlight 10-1 flowing into the window 30 during the external light affecting the external light influence solution system of the mobile robot.

As described above, when the filter unit 230 is applied to the at least one camera 221, even if external light in the visible light band can be blocked, bands other than the visible light included in the sunlight 10-1 flowing from the window 30 and/or light having the same wavelength as the laser irradiated by the light emitter 210 (e.g., IR band) cannot be blocked.

Figure 5B:
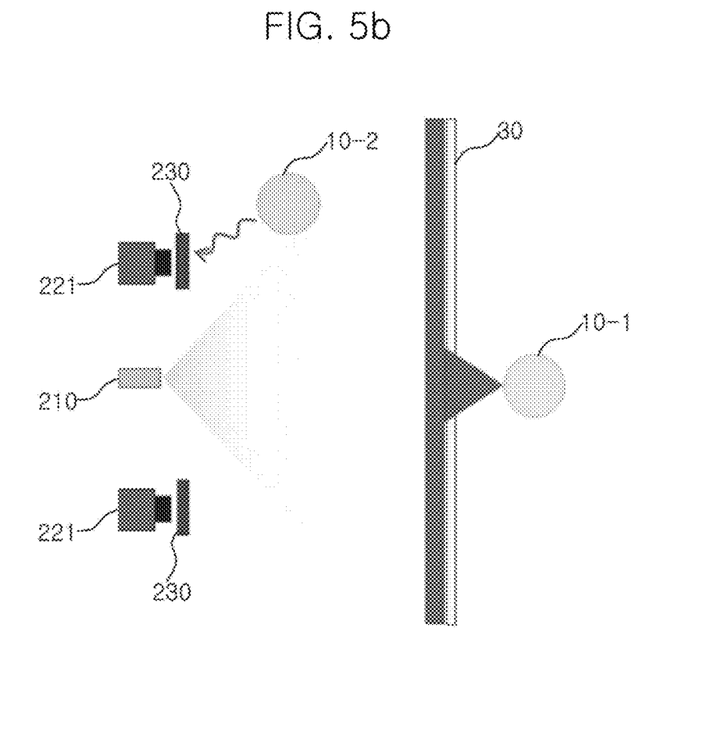

Therefore, as shown in FIG. 5B, by providing an external filter 231 on the window 30, excluding the laser irradiated by the light emitter 210, the influence of external light received by the light receiver 220 which may affect the operation of the controller 240 can be minimized.

In addition, as described above, when the filter to be installed in the window 30, i.e., the external filter 231, is implemented as a blackout material as before, it may cause a great impact on indoor lighting or interior, and may not be easy to use. Therefore, the external filter 231 may be desirable to be implemented to transmit external light in the visible light band among sunlight 10-1, and selectively block only light in a specific band (e.g., IR band, etc.) that may affect the operation of the controller 240.

As described above, the external light influence solution system for the mobile robot according to the technical idea of the present disclosure may, while including not only the filter unit 230 provided in the mobile robot 100 itself, but also the external filter 231 capable of minimizing the influence of external light such as sunlight 10-1 flowing into the place where the mobile robot 100 is provided and the service is provided, have an effect of fundamentally blocking the occurrence of various errors of the mobile robot 100 due to external light and not interfering with lighting or interior of a place where the mobile robot 100 is provided.

Figure 6:
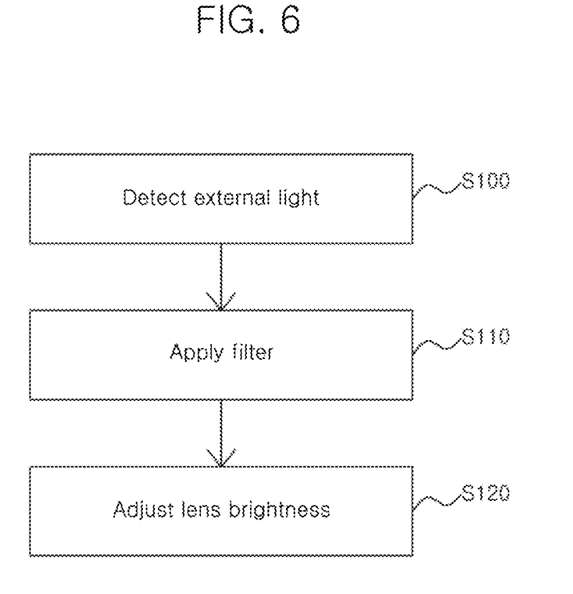
FIG. 6 illustrates a schematic flow of a method for external light influence solution of a mobile robot in accordance with an embodiment of the present disclosure.

FIG. 6 illustrates a schematic flow of a method for external light influence solution of a mobile robot in accordance with an embodiment of the present disclosure.

Referring to FIG. 5, the external light influence solution system of the mobile robot according to an embodiment of the present disclosure may detect the external light 10 received by the light receiver 220 (s100).

In addition, the external light influence solution system of the mobile robot may apply a filter corresponding to the detected external light 10 (s110).

In this case, the external light influence solution system of the mobile robot may, after the filter is applied in the step s110, by adjusting the lens brightness of the at least one camera using light (e.g., laser) irradiated from the light emitter 210 (s120), allow the light (eg, laser) to be received more smoothly.

Further, a method for external light influence solution of a mobile robot according to an embodiment of the present disclosure may be implemented in the form of computer-readable program instructions and stored in a computer-readable recording medium, and a control program and a target program according to an embodiment of the present disclosure may also be stored in a computer-readable recording medium. Computer-readable recording media includes all kinds of recording devices in which data that can be read by a computer system is stored.

Program instructions recorded on a recording medium may be those specifically designed and configured for the present disclosure, or may be known and usable to those skilled in the software field.

Examples of computer-readable recording media include magnetic media such as hard disks, floppy disks, and magnetic tapes, optical media such as CD-ROMs and DVDs, magneto-optical media such as optic disks, and hardware devices specifically configured to store and execute program instructions such as ROM, RAM, flash memory, and the like. In addition, the computer-readable recording medium is distributed in computer systems connected through a network, so that computer-readable codes can be stored and executed in a distributed manner.

Examples of program instructions include machine language code, such as those produced by compilers, as well as high-level language code that can be executed by devices that process information electronically using interpreters or the like, such as computers, for example.

The hardware devices described above may be configured to operate as one or more software modules to perform the operations of the present disclosure, and vice versa.

The description of the present disclosure described above is for illustrative purposes only, and those skilled in the art to which the present disclosure pertains will understand that it can be easily modified into other specific forms without changing the technical spirit or essential characteristics of the present disclosure. Therefore, the embodiments described above should be understood as illustrative in all respects and not limiting. For example, each component described as a single type may be implemented in a distributed manner, and similarly, components described as distributed may also be implemented in a combined form.

The scope of the present disclosure is indicated by the claims described below rather than the detailed description above, and all changes or modifications derived from the meaning and scope of the claims and their equivalent concepts should be construed as being included in the scope of the present disclosure.

The present disclosure can be used for an external light influence solution system of a mobile robot and a method therefor.

Although certain exemplary embodiments and implementations have been described herein, other embodiments and modifications will be apparent from this description. Accordingly, the inventive concepts are not limited to such embodiments, but rather to the broader scope of the appended claims and various obvious modifications and equivalent arrangements as would be apparent to a person of ordinary skill in the art.

The invention claimed is:

1. An external light influence solution system of a mobile robot, comprising:
   the mobile robot; and
   a control system configured to control an operation of the mobile robot, wherein
   the control system comprises:
   a light emitter configured to irradiate light for sensing;
   a light receiver comprising at least one camera and configured to receive the light irradiated from the light emitter;
   a filter unit disposed on a front side of the light receiver to be spaced apart from the light receiver by a predetermined distance to block external light of a specific wavelength toward the light receiver; and a controller configured to measure a distance to an obstacle based on the light received by the light receiver, the controller is configured to adjust a lens brightness of the camera for receiving the light, and in response to receiving an external light corresponding to direct sunlight, the controller is configured to move the mobile robot to a place where the received direct sunlight falls below a predetermined level and then adjust the lens brightness.

2. The external light influence solution system of a mobile robot of claim 1, wherein the light emitter is configured to irradiate a laser with a specific pattern.

3. The external light influence solution system of a mobile robot of claim 1, wherein the controller is configured to adjust the lens brightness so that an amount of light received by the light receiver has a maximum value.

4. The external light influence solution system of a mobile robot of claim 1, wherein the filter unit comprises a plurality of filters, and the controller is configured to allow a specific filter among the plurality of filters to be selectively disposed on the front side of the light receiver according to a time zone or a wavelength range of external light received by the light receiver.

5. A mobile robot, comprising:

a driving unit;

a light emitter configured to irradiate light for sensing;

a light receiver comprising at least one camera and configured to receive the light irradiated from the light emitter;

a filter unit disposed on a front side of the light receiver to be spaced apart from the light receiver by a predetermined distance to block external light of a specific wavelength toward the light receiver; and a controller configured to control drive of the driving unit and measure a distance to an obstacle based on the light received by the light receiver, wherein the controller is configured to adjust a lens brightness of the camera for receiving the light, and in response to receiving an external light corresponding to direct sunlight, the controller is configured to move the mobile robot to a place where the received direct sunlight falls below a predetermined level and then adjust the lens brightness.

6. A method for external light influence solution, the method comprising:

detecting external light received, by an external light influence solution system of a mobile robot;

when the external light is detected, applying a filter capable of blocking external light of a specific wavelength band to the mobile robot, by the external light influence solution system of the mobile robot;

adjusting a lens brightness of a camera for receiving light by using light irradiated from a light emitter configured to irradiate light for sensing, by the external light influence solution system of the mobile robot, and moving, in response to receiving an external light corresponding to direct sunlight, the mobile robot to a place where the received direct sunlight falls below a predetermined level and then adjusting the lens brightness.

* * * * *